July 24, 1956
H. LORANT ET AL
2,755,661
PIPE TESTING MACHINE
Filed May 14, 1953
2 Sheets-Sheet 1
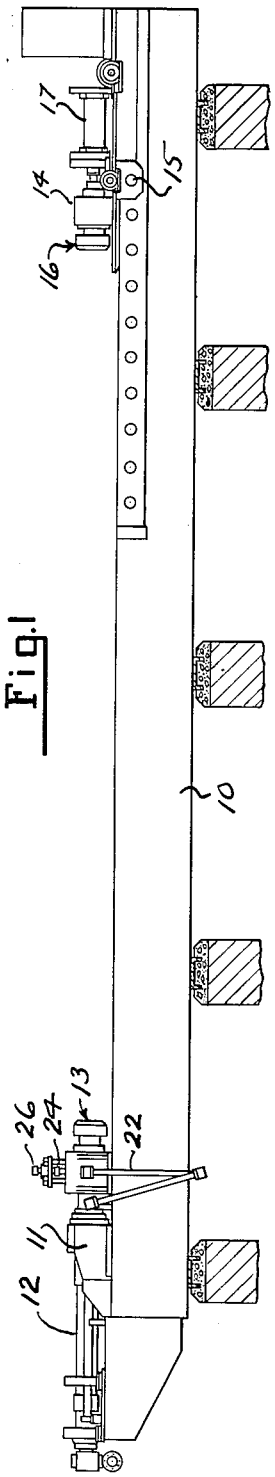
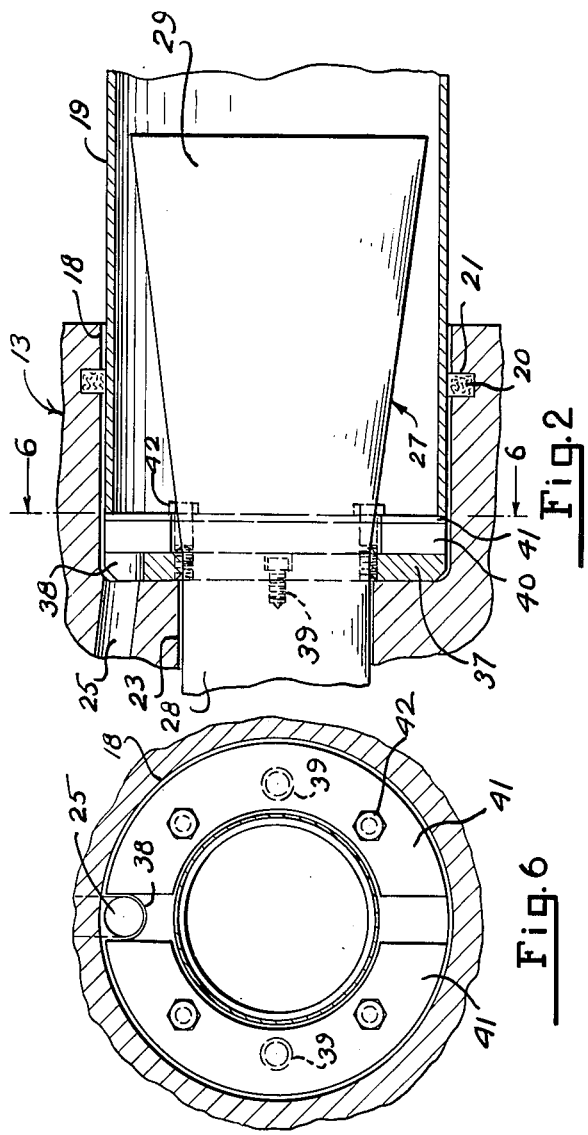
INVENTOR.
HUGO LORANT
FRANCIS J. KENT
BY
Pollard and Johnston
ATTORNEYS

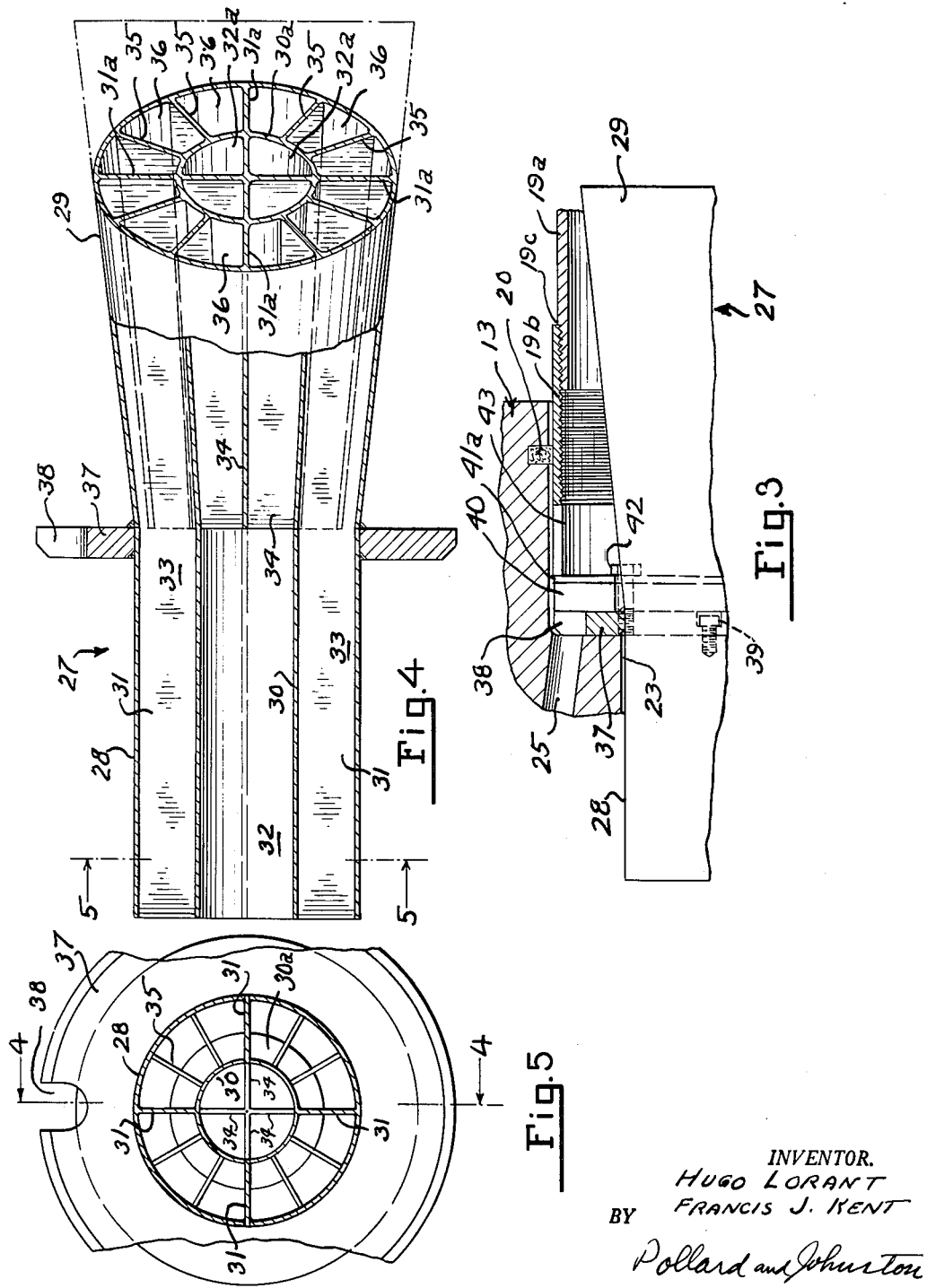

United States Patent Office 2,755,661
Patented July 24, 1956

2,755,661

PIPE TESTING MACHINE

Hugo Lorant, New York, and Francis J. Kent, Forest Hills, N. Y., assignors, by mesne assignments, to Baldwin-Lima-Hamilton Corporation, Philadelphia, Pa., a corporation of Pennsylvania Application May 14, 1953, Serial No. 354,930

3 Claims. (Cl. 73—49.5)

This invention relates generally to improvements in machines for testing the mechanical strength and fluid tightness of pipes, tubes and the like, or for expanding such pipes, and is particularly concerned with a nozzle device, suitable for use with a machine of the described character, through which the pipe or the like to be tested or expanded is initially filled with water or any other liquid employed in the testing or expanding procedure.

A testing machine of the kind mentioned may include two sealing heads in axial alignment and movable inwardly relative to each other so as to fit against or over the ends of the pipe or the like to be tested. One of the sealing heads may be mounted on a hydraulic ram in a stationary housing at one end of the machine, and the other sealing head may be mounted on a shiftable carriage at the other end of the machine, with the last mentioned carriage being shiftable along the frame of the machine to accommodate pipes of different lengths between the sealing heads. The shiftable carriage sealing head may be stationary relative to the shiftable carriage or it may be carried by a hydraulic ram or other movable means on the shiftable carriage and thereby movable relative to the latter. After the pipe to be tested has been placed between the two sealing heads, the latter are moved toward each other to fit against or over the ends of the pipe. Water, or some other suitable testing liquid, is then directed into the pipe through one of the sealing heads and the adjacent end of the pipe and, as the pipe is filled, the air displaced by the water, is permitted to escape through a suitable air exhaust valve arrangement. When the pipe is completely filled with water, or other testing liquid, a relatively high pressure is applied to the testing liquid to determine whether the pipe is sufficiently strong to contain such a pressure in a leak-proof manner.

The same general arrangement and procedure is used in pipe expanding machines where a pressurized liquid is employed for the purpose of radially expanding the pipe to effect the cold working and sizing of the pipe.

A machine in which devices embodying the present invention are particularly adaptable for use is illustrated in co-pending application, now Patent No. 2,671,338, issued March 9, 1954.

In testing or expanding pipes or the like in a machine similar to that described above, the filling of the pipe with water or testing liquid can be effected in a relatively short period of time if the diameter of the pipe is not much larger than the diameter of the water supply line opening through one of the sealing heads into the pipe. However, when the pipe has a diameter which is substantially larger than that of the water supply line, an unproportionally long period of time is often required to eject the air from the pipe and complete the filling with water. It has been observed that this delay in initially filling the pipe to be tested or expanded results from the turbulence of the water within the pipe caused by the abrupt passage from the relatively small diameter water supply line into the relatively large diameter pipe. The increased time required for initially filling the pipe to be tested is particularly objectionable when the testing or expanding machine is installed in a plant producing the pipes and is required to work rapidly in order to test all of the pipes that are being produced.

Accordingly, it is an object of the present invention to provide means for facilitating and accelerating the filling of a pipe or the like in a machine of the described character.

Another object is to provide a device in a machine of the described character for ensuring the smooth flow of water from the water supply pipe into the pipe to be tested or expanded, even though the diameter of the pipe is substantially larger than the diameter of the water supply line, and thereby to minimize the time required for the initial filling of the pipe.

In a preferred form of the invention, the above objects may be achieved by providing an open ended tubular extension or nozzle for receiving the water discharged from the water supply line and projecting it into the end portion of the pipe held in or by the related sealing head. The term "nozzle" refers generally to a mouthpiece or terminal pipe. The tubular extension or nozzle may be provided with at least a portion thereof which flares outwardly toward the discharge end so that the cross-sectional area of the water flow is gradually expanded during the flow through the flaring portion and an abrupt expansion of the flow of water upon discharge into the pipe is avoided. Further, this tubular extension preferably is provided with water guides which may take the form of a series of axially extending radial partition walls which arrest any spiral swirling of the water flowing at a relatively high speed out of the water supply line so that the water, upon entering the pipe, is made to flow rectilinearly and the development of extreme turbulence in the pipe is inhibited. A cylindrical partition wall also may be provided within the tubular extension or nozzle and arranged concentrically with the latter to cooperate with the radial partition walls in defining mutually separated passages through the tubular extension for further reducing turbulence in the water flow.

Other objects, features and advantages of the invention will become apparent from the following detail description of exemplary embodiments when read in connection with the accompanying drawings, forming a part hereof, and wherein:

Fig. 1 is a schematic side elevational view of one type of pipe testing machine in which the present invention can be employed;

Fig. 2 is a fragmentary side elevational view, partly broken away and in section, of a portion of the testing machine of Fig. 1, and showing the arrangement of a nozzle device embodying the present invention and the related end of a pipe to be tested;

Fig. 3 is a fragmentary view similar to Fig. 2, but showing the arrangement of the parts for testing a pipe having a coupling on the end thereof;

Fig. 4 is an enlarged side elevational view, partly broken away and in section along the line 4—4 of Fig. 5, of the nozzle device shown in each of Figs. 2 and 3;

Fig. 5 is a transverse sectional view along the line 5—5 of Fig. 4; and

Fig. 6 is a transverse sectional view taken along the line 6—6 of Fig. 2, the partitions being omitted.

Referring to the drawings in detail, and initially to Fig. 1 thereof, showing a pipe testing machine of the kind in which a nozzle device embodying the present invention can be installed, it will be seen that such a testing machine includes a frame 10 having a stationary housing 11 mounted at one end thereof, said stationary carriage or housing 11 supporting a hydraulic motor 12 which carries a sealing head 13 and is operative to move the latter relative to the frame 10. A shiftable carriage 14 is mounted on the frame 10 at a location spaced from the stationary housing 11, and locking means 15 is provided for adjustably locking the shiftable carriage at any desired location on the frame 10. The shiftable carriage 14 carries a sealing head 16 which may be mounted on a hydraulic motor 17 so that the sealing head 16 is movable longitudinally relative to the shiftable carriage. In arranging the testing machine for the reception of a particular length of pipe between the sealing heads 13 and 16, the shiftable carriage 14 is adjustably locked, by the means 15, at a location on the frame 10 which provides a span between the sealing heads only slightly greater than the length of the pipe to be tested. Then the pipe is raised into axial alignment with the sealing heads and one, or both, of the latter is moved axially toward the other to reduce the space between the sealing heads and thereby clamp the pipe between the heads 13 and 16. It is apparent that either both of the sealing heads 13 and 16 can be carried by hydraulic motors, as described above, for movement with respect to the related carriages, or only one of the sealing heads, and preferably the sealing head 13 on the stationary carriage or housing, may be carried by a hydraulic ram so that the final closing of the space between the sealing heads is effected by movement of the sealing head carried by the hydraulic ram toward the other sealing head.

Each of the sealing heads is formed with a cylindrical recess 18 (Figs. 2 and 6) opening axially in the direction toward the other of the sealing heads and dimensioned to receive the adjacent end portion of the pipe 19 to be tested. A sealing ring or packing 20 is disposed in an annular groove 21 formed in the surface of the recess 18 and tightly engages the outer surface of the end portion of the pipe 19 extending into the related recess.

Water, or some other suitable testing liquid, is supplied to the pipe held between the sealing heads 13 and 16 through one of said heads and enters axially through the related end of the pipe. In the illustrated embodiment of the invention, the water is supplied to the pipe through the sealing head 13 on the stationary housing 11 and is led to the sealing head through a water supply line 22 (Fig. 1) which opens into an axial passage 23 (Fig. 2) formed in the head 13 in axial alignment with the recess 18 and opening centrally into the latter. A suitable valve arrangement 24 (Fig. 1) may be employed for the purpose of controlling the flow of water through the passage 23 to a pipe sealed in the heads 13 and 16. The head 13 has another passage 25 opening into the recess 18 through the inner wall of the latter and at a location adjacent the top of the inner wall for permitting the escape of air from the pipe 19 as water is supplied to the latter through the passage 23. A suitable valve arrangement 26 (Fig. 1) may be associated with the passage 25 to prevent the escape of water through the latter during the actual testing of the pipe.

In accordance with the present invention, a tubular extension or nozzle device, generally identified by the reference numeral 27, extends from the axial water supplying passage 23 into the end portion of the pipe 19 sealed in the recess 18 of the sealing head 13 for the purpose of smoothing out the flow of water from the relatively small diameter water supplying passage 23 into the relatively large diameter pipe 19 so that turbulence of the character that would interfere with the escape of air through the passage 25 and delay the filling of the pipe is thereby avoided.

The nozzle device 27 includes an outer shell having a straight cylindrical portion 28 diametrically dimensioned to fit into the water supply passage 23, and a frusto-conical portion 29 extending from the cylindrical portion 28 and increasing in diameter in the direction toward the free end thereof. The frusto-conical portion 29 is dimensioned, at its largest end, to fit with some clearance within the pipe 19, as shown in Fig. 2. The turbulence resulting from the discharge of water from the relatively small diameter water supplying passage into the relatively large diameter pipe can be effectively reduced by gradually increasing the cross-sectional area of the water flow prior to the discharge of the water into the pipe. In addition, since water flowing through a tube or pipe at a relatively high speed frequently tends to swirl or spiral and since this motion is a factor in producing turbulence when the water flow is discharged into a relatively large diameter pipe, the undesirable turbulence can be further reduced by preventing the swirling or spiral motion within the water supplying passage before the discharge of the water into the relatively large diameter pipe to be tested. Thus, in accordance with the present invention, the nozzle device 27 is provided with axially extending radial partitions 27 within the portions 28 and 29 of the outer shell. Summarizing, in accordance with the present invention the frusto-conical portion 29 of the outer shell serves to gradually increase the area of the water flow and the interior of the outer shell is divided into series of mutually separated and generally axially extending open ended cells, each of these cells increasing gradually in cross-sectional area between the inlet and discharge ends thereof, so that the portion of the water flow passing through each of the open ended cells undergoes a corresponding gradual expansion in cross-sectional area and there is no localized or sudden expansion to give rise to objectionable turbulence.

In the embodiment of the invention illustrated in the drawings, a cylindrical partition wall 30 is disposed within the cylindrical portion 28 and arranged co-axially with respect to the latter, and axially extending radial partition walls 31 are also arranged in the interior of the shell portion 28 between the latter and the cylindrical partition wall 30. The cylindrical partition wall 30 defines a central open ended cell 32 and in conjunction with the radial partition walls 31 defines four outer open ended cells 33 arranged circularly around the central cell 32 and separated from each other and from the central cell. The cylindrical partition wall 30 is preferably dimensionally proportioned relative to the outer shell portion 28 so that the cells 32 and 33 are approximately of the same cross-sectional area.

The interior of the frusto-conical portion 29 of the outer shell is similarly provided with a substantially tapered tubular partition wall 30a which extends from the cylindrical partition wall 30 and slightly flares or increases in diameter in the direction toward the discharge end of the nozzle device 27. Radial partition walls 34 are arranged within the partition wall 30a to subdivide the interior of the latter into four mutually separated open ended cells 32a which receive the water flowing through the central cell 32 of the cylindrical portion 28. Other radial partition walls 31a are disposed between the flaring or tapering portion 29 of the outer shell and the tubular partition wall 30a in axial alignment with the radial partition walls 31 and additional radial partition walls 35 are arranged between the partition walls 31a to further divide the spaces defined between the walls 29 and 30a. The taper of the tubular partition wall 30a is preferably less than that of the outer shell portion 29 so that the cross-sectional areas of the open ended cells 36 defined between the tubular partition walls 29 and 30a and the radial partition walls 31a and 35, as well as of the cells 32a, all increase approximately to the same degree toward the discharge end of the nozzle device. Preferably, the various partition walls within the outer shell portion 29 are all dimensioned so that the cells 32a and 36 are all of similar or substantially the same area in any radial plane through the flaring portion of the nozzle device. Thus, as the water flows through the nozzle device 27, from left to right as viewed in Fig. 4, the stream of water is separated into similar or substantially equal portions and each of the separated portions of the water flow undergoes a gradual expansion prior to discharge while the various radial partition walls prevent swirling of water flow as a whole.

The stream of water discharged from the nozzle device 27 substantially fills the pipe 19 of relatively large diameter and, due to the absence of objectionable turbulence, the pipe can be filled in a short period of time and tested by applying pressure to the water filling the pipe.

In order to provide for mounting of the nozzle device 27 on the head 13, the outer shell of the device, at the junction of the portions 28 and 29 thereof, has an annular flange 37 extending radially outward therefrom and dimensioned to fit into the recess 18 and seat upon the inner flat wall surface of the latter. The flange 37 is formed with a notch or cutout 38 which is disposed to register with the air escape passage 25 (Fig. 2), and bolts or machine screws 39 (Figs. 2, 3 and 6) extend through suitable countersunk holes in the flange and are threaded into tapped bores opening into the recess 18 to hold the flange against the inner flat wall surface of the recess 18.

When a pipe having a smooth outer surface, as distinguished from a pipe having couplings on the ends thereof, is to be tested, spacing members 40 having metal bearing plates 41 at one side thereof are bolted to the flange 37, for example, by bolts 42 threaded into suitable tapped holes in the flange 37, so that the end edge of the pipe 19 (Fig. 2) in the recess 18 bears against the plates 41 with the spacing members 40, which are preferably formed of wood, to provide a cushion between the plates 41 and the flange 37. As seen in Fig. 6, the plates 41 and spacing members 40 are preferably formed as almost semi-circular sections of an annular ring with the ends of the sections being spaced apart to provide a space for passage of the air from the pipe into the notch 38 and air escape passage 25. The plates 41 and members 40 are thus in two parts so as to permit assembly and disassembly.

When a pipe having a coupling on one or both ends thereof is to be tested, for example, the pipe 19a of Fig. 3 having a coupling 19b threaded on the illustrated end thereof, the flat bearing plates 41, in each of the sealing heads receiving a pipe end having a coupling thereon, are replaced by similarly shaped bearing plates 41a, each of which has a substantially semi-cylindrical collar 43 extending therefrom to abut edgewise against the coupling 19b. Thus, the distance that the coupling 19b can extend into the recess 18 of the sealing head is limited to ensure that the coupling 19b is in the desired position, to engage a coupling locking device (not shown).

While the nozzle device embodying the invention has been described herein in connection with a pipe testing machine, it is apparent that it can be advantageously used in similar machines, such as pipe expanding machines, and that the details of construction of the described embodiments can be varied without departing from the spirit of the invention except as defined in the appended claims.

What is claimed is:

1. In a pipe testing machine having sealing heads for supporting a pipe to be tested at the opposite ends of the latter, and a test liquid supplying passage in at least one of the sealing heads having a cross-sectional area smaller than that of the pipe to be tested for supplying test liquid to the related end of the pipe; the combination including a separate nozzle device comprising an elongated, open-ended hollow shell of relatively small cross-sectional area at one end to fit into the test liquid supplying passage in the sealing head, said shell including a portion increasing gradually in cross-sectional area toward the other end of said shell to extend a substantial distance into the adjacent end of the pipe to be tested, and longitudinally extending partition walls in said shell dividing the interior of the latter into mutually separated cells which are open at the opposite ends thereof and have gradually increasing cross-sectional areas in said portion of the shell so that said partition walls halt the swirling of the test liquid during flow of the latter through the shell and the flow of test liquid is divided among said separated cells to minimize the expansion effect on the liquid during flow through said portion of the shell.

2. In a pipe testing machine having sealing heads for supporting a pipe to be tested at its opposite ends, and a test liquid supplying passage in at least one of the sealing heads having a cross-sectional area smaller than that of the pipe to be tested; the combination including a separate nozzle device for leading the test liquid from the supplying passage into the adjacent end of the pipe, said nozzle device comprising a tubular shell open at its opposite ends and having a relatively small diameter end portion fitting into the test liquid supplying passage in the sealing head and a flaring portion increasing in diameter to the other end of said shell to extend a substantial distance into the adjacent end of the pipe, a longitudinally extending tubular partition wall arranged coaxially within said tubular shell and having a portion of gradually increasing diameter within said flaring portion of the shell, and longitudinally extending radial partition walls between at least said tubular partition wall and said shell, said partition walls dividing the interior of the shell into mutually separated open ended cells having gradually increasing cross-sectional areas in said flaring portion of the shell so that the flow of test liquid through said shell is split-up into gradually diverging streams and swirling of the flow of test liquid is halted by said partition walls to avoid turbulence at the discharge of the test liquid into the pipe.

3. In a pipe testing machine of the described character; the combination comprising two spaced apart sealing heads, each of said heads having a cylindrical recess opening toward the other of said heads to receive and support an end portion of a pipe to be tested, an annular seal in each of said recesses for sealing engagement with the end portion of a pipe in the related recess, at least one of said sealing heads having a test liquid supplying passage opening axially into the related recess, and a nozzle device for effecting the non-turbulent discharge of test liquid from said passage into the adjacent end of the pipe, said nozzle device including a tubular, open-ended shell fitting at one end into said passage and extending through the related recess to fit into the adjacent end of a pipe, a radial flange extending outwardly from said shell to bear against the bottom of the related recess, means securing said flange against said bottom of the recess, and spacing means secured to the face of said flange directed toward the open end of said related recess for disposition between the end edge of a pipe and said flange.

References Cited in the file of this patent

UNITED STATES PATENTS

| | | |
|---|---|---|
| 1,811,138 | Lassman | June 23, 1931 |
| 1,973,674 | Rosenkranz | Sept. 11, 1934 |
| 2,054,964 | Barker | Sept. 22, 1936 |
| 2,558,238 | Collins | June 26, 1951 |
| 2,655,182 | Hayes | Oct. 13, 1953 |